(12) United States Patent
Petrac

(10) Patent No.: US 8,876,040 B2
(45) Date of Patent: Nov. 4, 2014

(54) METHOD FOR CONTROLLING THE INTERNAL PRESSURE IN AN AIRCRAFT

(75) Inventor: Markus Petrac, Deinste (DE)

(73) Assignee: Airbus Operations GmbH, Hamburg (DE)

( * ) Notice: Subject to any disclaimer, the term of this patent is extended or adjusted under 35 U.S.C. 154(b) by 1107 days.

(21) Appl. No.: 12/496,869

(22) Filed: Jul. 2, 2009

(65) Prior Publication Data

US 2010/0001127 A1   Jan. 7, 2010

Related U.S. Application Data

(60) Provisional application No. 61/134,138, filed on Jul. 7, 2008.

(30) Foreign Application Priority Data

Jul. 4, 2008 (DE) .......................... 10 2008 040 184

(51) Int. Cl.
*B64D 33/02* (2006.01)
*B64D 13/04* (2006.01)

(52) U.S. Cl.
CPC ...................................... *B64D 13/04* (2013.01)
USPC .......... 244/53 B; 244/118.5; 454/71; 454/237; 454/322

(58) Field of Classification Search
USPC ............. 244/53 B, 97–99, 118.5; 454/70–74, 454/237, 290, 295, 322
See application file for complete search history.

(56) References Cited

U.S. PATENT DOCUMENTS

| 3,101,918 A | | 8/1963 | Evelyn et al. |
| 3,426,984 A | * | 2/1969 | Emmons .................... 244/117 R |
| 4,351,501 A | * | 9/1982 | Peash et al. ................. 244/129.1 |

(Continued)

FOREIGN PATENT DOCUMENTS

DE 197 13 125    10/1998
WO WO 2005/016748 A2    2/2005

OTHER PUBLICATIONS

German Office Action from DE 10 2008 040 184.6 dated Jun. 9, 2009.

*Primary Examiner* — Timothy D Collins
*Assistant Examiner* — Nicholas McFall
(74) *Attorney, Agent, or Firm* — Jenkins, Wilson, Taylor & Hunt, P.A.

(57) ABSTRACT

The present invention provides a method for controlling an internal pressure in an aircraft or spacecraft, the method comprising the following steps: detecting the internal pressure in the craft and an external pressure Pa outside of the craft and comparing said pressures with each other; and adjusting a flap of at least one outflow valve to a blade position, in which the flap directs air flowing past an outer surface of the craft into the craft to increase the internal pressure, if the external pressure exceeds the internal pressure by a predetermined value during the descent of the craft. The idea, on which the present invention is based, is to assign a double function to the outflow valve: during normal flight the positive pressure in the craft is relieved by means of the outflow valve. During a too steep descent or in case of failure of the air conditioner of the craft, the flap directs air into the craft and thus adapts the internal pressure to the external pressure as soon as it exceeds the internal pressure. Thus, a negative pressure relief valve is advantageously not required and a size thereof can be considerably reduced respectively.

3 Claims, 2 Drawing Sheets

(56) References Cited

U.S. PATENT DOCUMENTS

| | | |
|---|---|---|
| 5,105,729 A | 4/1992 | Signoret et al. |
| 6,273,136 B1 * | 8/2001 | Steinert et al. ............... 137/630 |
| 7,014,144 B2 * | 3/2006 | Hein et al. .................. 244/53 B |
| 2002/0173263 A1 * | 11/2002 | Petri et al. ..................... 454/74 |
| 2004/0216792 A1 * | 11/2004 | Bunn et al. ................ 137/899.2 |

\* cited by examiner

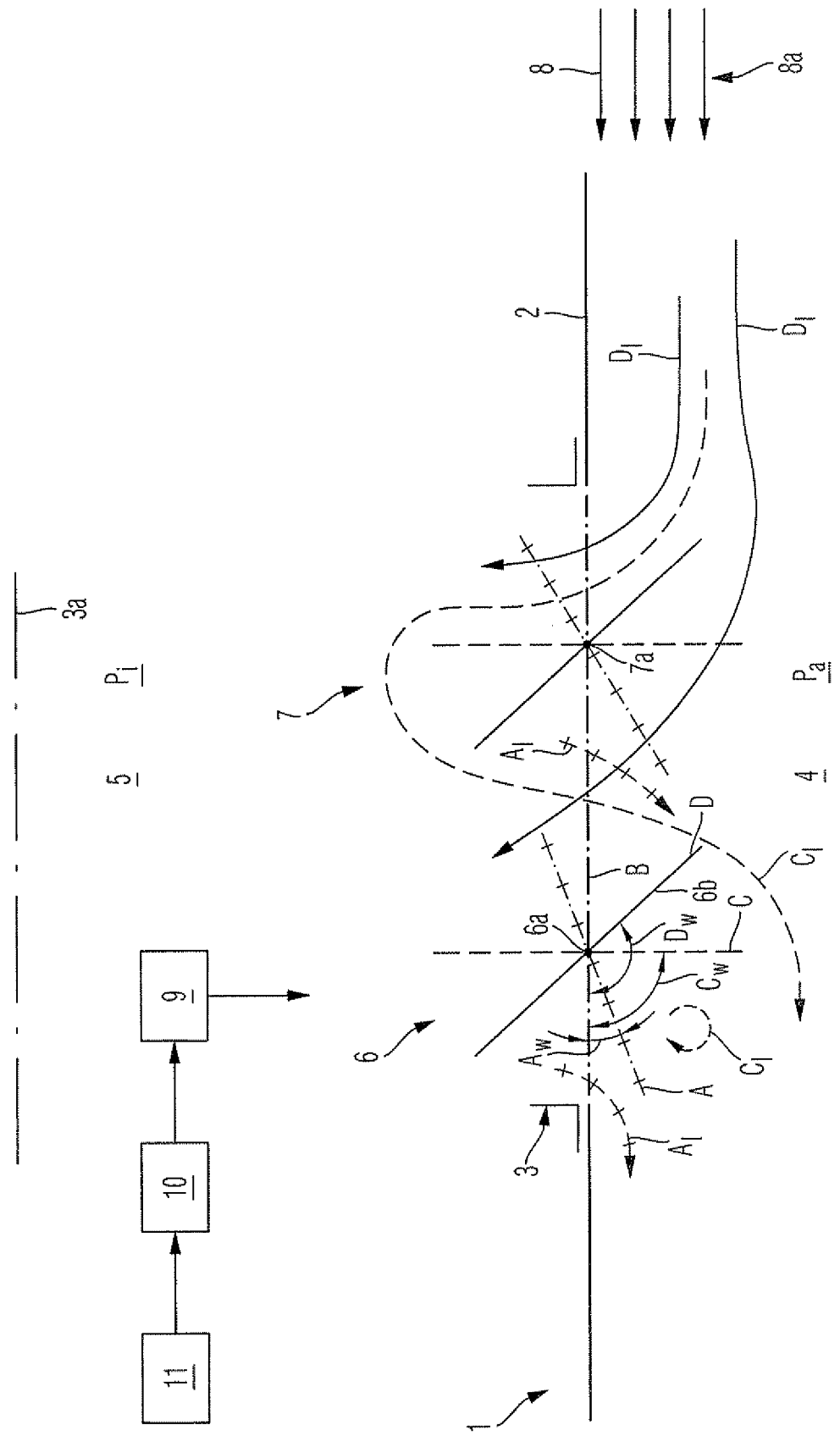

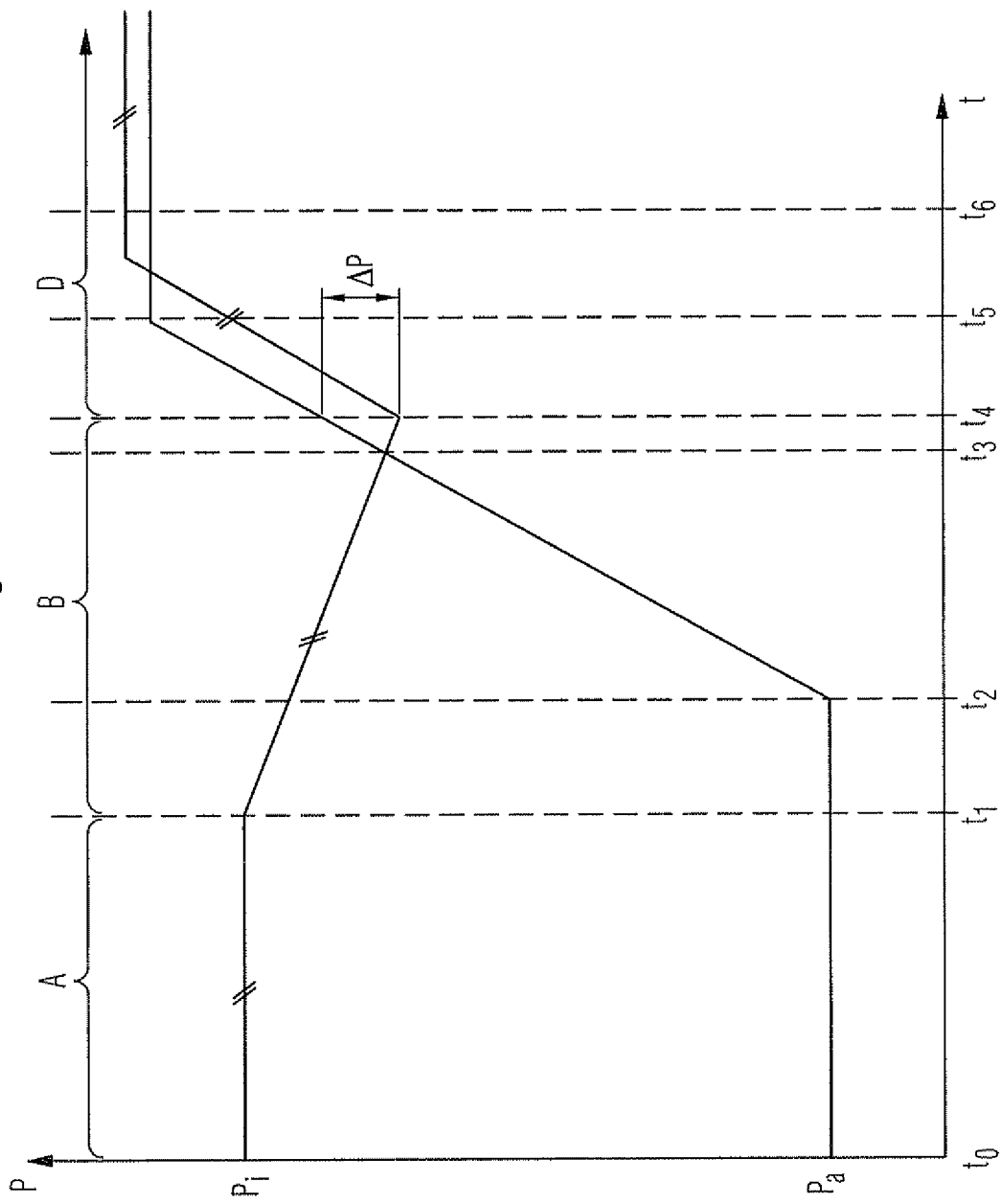

METHOD FOR CONTROLLING THE INTERNAL PRESSURE IN AN AIRCRAFT

CROSS-REFERENCE TO RELATED APPLICATIONS

This application claims the benefit of U.S. Provisional Application No. 61/134,138, filed Jul. 7, 2008 and German patent application No. 10 2008 040 184.6, filed Jul. 4, 2008, the entire disclosures of which are herein incorporated by reference.

FIELD OF THE INVENTION

The present invention relates to a method for controlling the internal pressure in an aircraft and to an aircraft.

Although being applicable to any aircrafts or spacecrafts, the present invention and the problem on which it is based are further explained with reference to a passenger aircraft.

BACKGROUND OF THE INVENTION

In civil aviation a pressurized cabin is understood to be a configuration of a passenger cabin, cockpit and cargo compartment for high-flying airplanes which, under these life-threatening conditions per se, facilitates a flight without the use of oxygen masks for people. This is achieved by an artificially changed air pressure, which is increased with respect to the surroundings, within the cabin. The pressurized cabin is not hermetically sealed, but fresh air is steadily supplied and a part of the stale air is discharged from the pressurized cabin. The required supply air is supplied into the airplane by means of an air conditioner, so-called packs. In doing so, a relative positive pressure prevails within the cabin; therefore, the internal pressure within the cabin is above the external pressure of the surroundings. In order to not unnecessarily load the cabin structure, a predetermined maximum differential pressure between the internal pressure and external pressure is set.

Here, pressure regulation within the pressurized cabin is substantially effected by means of the valves mentioned below: outflow valves, negative pressure relief valves and safety valves.

The pressure in the pressurized cabin is controlled by means of the outflow valves, which in turn are controlled by a pressure controller, safety valves being additionally provided, by means of which pressure can be released in case of emergency. In the process, the outflow valves control the outflow of the air from the cabin and thus maintain the predetermined positive pressure in the cabin.

A system for controlling the internal pressure of the cabin is described in DE 60 2004 003 946 T2, for example.

When the airplane is descending, wherein the external pressure rises, the internal pressure in the pressurized cabin is usually increased at the same time so that the internal pressure is always above the external pressure. In case of a too fast descent or in case of failure of the air conditioner during the descent, it may happen that the external pressure exceeds the internal pressure (reversal of the differential pressure).

In order to prevent the pressurized cabin from collapsing and therefore to relieve the negative pressure existing in the pressurized cabin, the negative pressure relief valves open, which respectively may be embodied as a spring-loaded flap, for example, which opens inwards. Opening the negative pressure relief valves results in a sudden increase of pressure in the pressurized cabin, which the pressure controller tries to compensate in that it adjusts the outflow valves to an opened position, in which the respective flap of the outflow valves has an angle of about 90 degree to the air inflow direction at the outside of the fuselage. In the 90 degree position of the flaps of the outflow valves a part of the respective flap protrudes into the airflow. Depending on the design, a more or less strong air turbulence lowering the static external pressure in the region behind the flap results behind the flaps. Thereby air is sucked out of the pressurized cabin by the outflow valves. However, this additional airflow from the outflow valves has in turn to be compensated by the negative pressure relief valves to prevent a too great drop of the internal pressure in the pressurized cabin. As a consequence, the negative pressure relief valves have to be designed comparatively large, which in turn has a negative effect on the strength of the fuselage in the area of the negative pressure relief valves and results in increased costs of the negative pressure relief valves respectively, since they have to be designed correspondingly more stable, as being larger.

SUMMARY OF THE INVENTION

Therefore, the object of the present invention is to provide a method for controlling the internal pressure in an aircraft and/or to provide an aircraft, which avoids the above mentioned drawbacks.

Said object is achieved by a method comprising the features of patent claim 1 and/or by an aircraft comprising the features of patent claim 5.

Accordingly, a method for controlling the internal pressure in an aircraft or spacecraft is provided, which comprises the following steps: detecting the internal pressure in the craft and an external pressure outside of the craft and comparing said pressures with each other; and adjusting a flap of at least one outflow valve to a blade position, in which the flap directs air flowing past an outer surface of the craft into the craft to increase the internal pressure, if the external pressure exceeds the internal pressure by a predetermined value, particularly during the descent of the craft.

Furthermore, an aircraft or spacecraft is provided, comprising: a detection means for detecting an internal pressure within the craft and an external pressure outside of the craft; a comparing means for comparing the internal pressure with the external pressure; at least one outflow valve having a flap, the outflow valve relieving positive pressure in the craft during normal flight; and an adjusting means adjusting the flap to a blade position, in which it directs air flowing past the outer surface of the craft into the craft to increase the internal pressure within the craft, if the comparing means determines that, in particular during the descent of the craft, the external pressure exceeds the internal pressure by a predetermined value.

The idea, on which the present invention is based, is to impose a double function on the outflow valves: during normal flight the internal pressure in the craft is above the external pressure of the surroundings. Therefore, in this state the positive pressure is released to the environment by the outflow valves. If the external pressure then exceeds the internal pressure, as it may be the case, for example, during a too steep descent or in case of failure of the air conditioner for building up the internal pressure in the aircraft or spacecraft, the outflow valves serve to increase the internal pressure to the level of the external pressure by directing air from the surroundings into the craft, in particular into the pressurized cabin. Ideally, even the conventionally provided negative pressure relief valves are thus not required.

But also in the case that the negative pressure relief valves are required, for example, due to the regulations in air traffic, by way of the method according to the invention and in the aircraft according to the invention respectively said negative pressure relief valves can be designed in a smaller size. The reason for this is that more air is pressed through the opened cross section in front of the flap of the outflow valve, when seen in flow direction of the air surrounding the aircraft, into the pressurized cabin by the outflow valve in its blade position than is sucked out by means of the previously described air turbulences behind the flap. Likewise, the decrease of the static external pressure behind the flaps is correspondingly lower, whereby the speed of the airflow from the craft into the surroundings through the outflow valves in turn decreases, For this reason, however, the necessary air volume also decreases, which has to continue to flow through the negative pressure relief valves to prevent the internal pressure from dropping. Thus, the negative pressure relief valves may be designed in a smaller size, which in turn is reflected in an improved structure of the fuselage and reduced costs of the negative pressure relief valves respectively.

Advantageous embodiments and improvements of the invention can be found in the dependent claims.

In the present document "flap" is preferably meant to be a throttle flap having an approximately central pivot point.

According to a preferred further embodiment of the method according to the invention, the flap of the outflow valve is set to an angle of between 90 and 180 degree, preferably between 90 and 135 degree, to an air inflow direction for the blade position. Thus, the flap, when positioned in the blade position, extends in sections towards the air inflow direction. Therefore, the airflow striking the flap is directed into the craft.

According to another preferred further embodiment of the method according to the invention, air is directed into the craft by at least one negative pressure relief valve at the same time at which the flap of the outflow valve is adjusted to the blade position. In this configuration air flows into the craft by means of both the outflow valve and the negative pressure relief valve, whereby the internal pressure in the craft can be very quickly adapted to the level of the external pressure.

According to another preferred further embodiment of the method according to the invention, positive pressure is released from the craft by means of the outflow valve during the normal flight. In the process, the advantageous double function, which was already previously described, benefits the outflow valve.

According to a preferred further embodiment of the aircraft or spacecraft according to the invention, the flap, when positioned in the blade position, has an angle of between 90 and 180 degree, preferably between 90 and 135 degree. The advantages resulting from this have already been explained in conjunction with the above described method according to the invention.

According to another preferred further embodiment of the aircraft or spacecraft according to the invention, the flap furthermore has a closed position, in which it has an angle of approximately 0 degree to the air inflow direction and closes an air path into the craft, and/or an opened position, in which is has an angle of approximately 90 degree to the air inflow direction and opens the air path into the craft. During normal flight the flap is suitably positioned between the blade position and the opened position to relieve the positive pressure in the craft. For the blade position, the flap is moved beyond the opened position by means of the adjusting means.

According to another preferred further embodiment of the aircraft or spacecraft according to the invention, at least one negative pressure relief valve is provided, which opens another air path into the craft, while the flap of the outflow valve is positioned in the blade position. On this, the advantages have also already been further described above in conjunction with the method according to the invention.

According to another preferred further embodiment of the aircraft or spacecraft according to the invention, at least one of the outflow valve and negative pressure relief valve is arranged in an outer wall of the fuselage of the craft and the air path and further air path respectively extends from the outer surface of the fuselage into a pressurized cabin of the craft. Therefore, a convenient structure of the craft results.

BRIEF DESCRIPTION OF THE DRAWINGS

The invention will be further explained below by means of embodiments with reference to the attached drawing figures, in which:

FIG. 1 schematically shows in longitudinal section a section of a fuselage of an airplane comprising an outflow valve with two flaps, which are illustrated in different positions, according to an embodiment of the invention; and FIG. 2 shows the course of time of the internal pressure and the external pressure according to the embodiment.

DETAILED DESCRIPTION OF THE DRAWINGS

In the figures same reference numbers denote the same or analogue components, unless stated to the contrary.

FIG. 1 schematically shows in a longitudinal section a section of a fuselage 1 of an airplane according to an embodiment of the present invention.

The fuselage 1 comprises a fuselage shell 2, into which an outflow valve 3 is integrated. The longitudinal direction of the airplane is designated by 3a. The outflow valve 3 connects the surroundings 4, in which an atmospheric pressure Pa prevails, with a pressurized cabin 5, in which an internal pressure Pi prevails, in the interior of the fuselage 1. Pi and Pa are respectively the static pressures.

The pressures Pa and Pi are plotted in FIG. 2 as a function of time for the different flight phases of the airplane as well as for the different positions of the outflow valve 3. In FIG. 2 the course of the internal pressure is illustrated by a line crossed out twice and the course of the external pressure is illustrated by a solid line.

The outflow valve comprises two flaps 6 and 7. The flaps 6, 7 are preferably formed as throttle flaps having an approximately central pivot point 6a, 7a.

In FIG. 1 each flap 6, 7 is shown in various positions, wherein the various positions are indicated by differently configured lines.

Since the positions of the flaps 6 and 7 correspond to each other, merely the positions of the flap 6 are further explained below.

The angles given below are, without exception, measured between an air inflow direction 8 of the air 8a flowing along the fuselage shell 2 and a portion 6b of the flap 6, which is suitable for moving into the air flow.

At the time t0, refer to FIG. 2, the airplane is in normal flight and the flap 6 is positioned in the outflow position A, which is shown by a crossed line in FIG. 1. In said outflow position A air A1 can be released from the pressurized cabin 5 for relieving the positive pressure within the same, which is built up by means of the air conditioner, and therefore, an internal pressure Pi being above the external pressure Pa, as shown in FIG. 2, prevails in the pressurized cabin 5.

In the outflow position A the flap has an angle Aw to the air inflow direction 8 of between 0 and 90 degree. The adjustment of the flap 6 is effected by means of the adjusting means 9, for example an electric actuator, which in turn is controlled by a pressure controller 10. The pressure controller 10, in particular a microprocessor, is connected to a detection means 11 in terms of signalling, which detects the internal pressure Pi and external pressure Pa. The pressure controller 10 compares the internal pressure Pi with the external pressure Pa and controls the adjusting means 9 depending on the result of the comparison.

If a failure of the air conditioner occurs at a time t1, i.e., it is no longer possible to supply fresh air into the cabin, the pressure controller 10 controls the adjusting means 9 to close the flap 6, whereupon said flap is positioned in the position B, for this refer to the dot and dash line in FIG. 1. As can be inferred from FIG. 2, after that, the internal pressure Pi within the cabin 5 slowly decreases due to leakages, for example in the door and window seals. The angle between the flap 6 and the air inflow direction 8 in the closed position B is about 0 degree.

Immediately after determining that the air conditioner has failed, the pilot will usually control the airplane into a descent in order to bring the airplane to an altitude, at which the external pressure is such that the health of the passengers is not at risk. In FIG. 2 the initiation of the descent is designated by the time t2.

After that, the external pressure Pa increases relatively steeply, whereas the internal pressure Pi slowly decreases, as described above. At the time t3, refer to FIG. 2, the internal pressure Pi in the pressurized cabin 5 and the external pressure Pa in the atmosphere meet each other, i.e., both pressures Pi and Pa are temporarily equal. If the airplane continues to descend unchanged, the external pressure Pa would clearly exceed the internal pressure Pi and therefore result in a collapse of the pressurized cabin 5 having fatal consequences.

In order to avoid this, a pressure compensation between the pressurized cabin 5 and the surroundings 4 has to occur at the time t3 or t4, at which the pressure difference $\Delta P(=Pa-Pi)$ between the external pressure Pa and the internal pressure Pi exceeds a predetermined threshold value Px.

In the approach internally known by the applicant the negative pressure relief valves, which are not further illustrated, open at the time t4 and at the same time the flap is adjusted to the opened position C by means of the adjusting means. In the opened position C the flap 6 has an angle Cw of approximately 90° to the air inflow direction 8. Because of the air 8a striking the flap 6 substantially perpendicularly, air vortexes C1, which have already been described initially and have the disadvantageous consequences, which have also been described initially, occur behind said flap. In FIG. 1 the opened position C is indicated by a dashed line.

In the now described solution according to the invention, the flap 6 is not adjusted to the opened position C, but to a blade position D by means of the adjusting means 9 as soon as the pressure controller 10 determines that the pressure difference Pa−Pi is greater than/equal to the predetermined threshold value Px. Said threshold value may be set in the pressure controller 10 and for example be between 0 and 0.2 bar. In addition, the angle Dw between the flap 6 and the air inflow direction 8 is between 90 and 180 degree. Therefore, the flap 6, when positioned in the blade position D, directs the inflowing air D1 into the pressurized cabin 5, whereby the pressure Pi in the pressurized cabin 5 considerably rises, as can be inferred from FIG. 2. In the process, the angle Dw is controlled by the adjusting means 9 and the pressure controller 10 respectively so that on the one hand the pressure difference $\Delta P$ does not exceed a predetermined limit and a collapse of the fuselage 1 can thus be prevented, and on the other hand the pressure increase rate in the pressurized cabin 5 is such that it is perceived by the passengers as being acceptable. Said limit may for example be at 55 to 100 millibar per minute. In the process, the flap will preferably take an angle Dw of between 90 and 135 degree.

Depending on the type of airplane and the applicable aviation regulations respectively, it may be necessary to open not illustrated negative pressure relief valves, through which air also flows from the surroundings 4 into the pressurized cabin 5 for increasing the internal pressure Pi of the pressurized cabin, concurrently with the flap 6 in the blade position. The required airflow through said negative pressure relief valves, which are not illustrated in the figures, however, may be considerably reduced due to the effect of the flaps 6, 7 in the blade position, whereby the size of the flaps of the negative pressure relief valves can also be advantageously reduced.

At the time t5 the airplane stops to descend, wherein the airplane has reached an altitude of about 2438 m or less, which is save for the passengers. At the time t6 the internal pressure Pi in the pressurized cabin 5 slightly rises above the external pressure Pa by means of the flap 6 in the blade position. The reason that this is possible without assistance by the air conditioner is that the external air comprising the static external pressure Pa flows into the pressurized cabin 5 through the outflow valve 3 at a high speed by means of the flap 6 in the blade position D and is decelerated there and thus causes the internal pressure Pi to rise above the external pressure Pa.

Although the present invention has been described in the present documents by means of preferred embodiments, it is not limited thereto, but may be modified in various ways.

Of course, the outflow valve may also be designed with merely one single flap or more than two flaps.

The invention claimed is:

1. Method for controlling an internal pressure in an aircraft or spacecraft, the method comprising:
   detecting the internal pressure in the aircraft or spacecraft and an external pressure outside of the aircraft or spacecraft and comparing said pressures with each other; and
   adjusting a flap of at least one outflow valve to a blade position, in which the flap directs air flowing past an outer surface of the aircraft or spacecraft into the aircraft or spacecraft to increase the internal pressure, if the external pressure exceeds the internal pressure of the aircraft or spacecraft by a predetermined value;
   wherein during normal flight positive pressure is released from the aircraft or spacecraft by the outflow valve.

2. Method according to claim 1, wherein said flap of the outflow valve is set to an angle of between 90 and 180 degrees to an air inflow direction of the passing air for the blade position.

3. Method according to claim 1, wherein at the same time at which the flap of the outflow valve is adjusted to the blade position air is directed into the aircraft or spacecraft by at least one negative pressure relief valve.

* * * * *